(12) United States Patent
Masuyama et al.

(10) Patent No.: US 10,285,905 B2
(45) Date of Patent: May 14, 2019

(54) MEDICAL RUBBER STOPPER AND METHOD FOR PRODUCING MEDICAL RUBBER STOPPER

(71) Applicant: Sumitomo Rubber Industries, Ltd., Kobe-shi, Hyogo (JP)

(72) Inventors: Yoshikazu Masuyama, Kobe (JP); Hiroaki Nakano, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 0 days.

(21) Appl. No.: 15/487,103

(22) Filed: Apr. 13, 2017

(65) Prior Publication Data

US 2017/0326031 A1    Nov. 16, 2017

(30) Foreign Application Priority Data

May 11, 2016    (JP) .................. 2016-095486

(51) Int. Cl.
| | | |
|---|---|---|
| *A61J 1/14* | (2006.01) | |
| *B65D 39/00* | (2006.01) | |
| *B29C 43/18* | (2006.01) | |
| *B65D 51/00* | (2006.01) | |
| *B29L 31/00* | (2006.01) | |
| *B29L 31/56* | (2006.01) | |

(Continued)

(52) U.S. Cl.
CPC .......... *A61J 1/1412* (2013.01); *A61J 1/1406* (2013.01); *B29C 43/184* (2013.01); *B65D 39/0005* (2013.01); *B65D 51/005* (2013.01); *B23K 26/364* (2015.10); *B23K 26/402* (2013.01); *B29C 2793/009* (2013.01); *B29L 2031/565* (2013.01); *B29L 2031/753* (2013.01)

(58) Field of Classification Search
CPC ......... A61J 1/1412; A61J 1/062; B23K 26/00; B65D 51/005; B65D 39/0005; B29C 43/203; B29C 43/184; B29C 2793/009; B29L 2031/753; B29L 2031/565
USPC ................................................. 215/355–364
See application file for complete search history.

(56) References Cited

U.S. PATENT DOCUMENTS 3,527,215 A * 9/1970 Witt ...................... A61J 1/2096
                                                      604/214
3,584,770 A * 6/1971 Taylor ...................... A61J 1/05
                                                      222/479

(Continued)

FOREIGN PATENT DOCUMENTS

GB         2106084    *  8/1982
JP         2004-216753 A  8/2004

*Primary Examiner* — Kareen K Thomas
(74) *Attorney, Agent, or Firm* — Birch, Stewart, Kolasch & Birch, LLP

(57) ABSTRACT

The present invention aims to provide a medical rubber stopper that is excellent in chemical resistance and airtightness while having good productivity. The present invention relates to a medical rubber stopper including: a disk-shaped head portion with a flange region; and a cylindrical leg portion protruding from the lower surface of the head portion and having a smaller diameter than the head portion, the lower surface of the flange region and the leg portion being laminated with an inert film, the lower surface of the flange region and/or the outer periphery of the leg portion being provided with an annular groove through which the base rubber is exposed.

6 Claims, 7 Drawing Sheets

B-B cross-sectional view

(51) Int. Cl.
*B23K 26/402* (2014.01)
*B23K 26/364* (2014.01)

(56) References Cited

U.S. PATENT DOCUMENTS

| | | | | |
|---|---|---|---|---|
| 4,265,364 | A * | 5/1981 | Baba | B65D 51/002 215/249 |
| 4,386,929 | A * | 6/1983 | Peery | A61M 5/152 222/211 |
| RE36,410 | E * | 11/1999 | Meshberg | B05B 11/0037 141/2 |
| 8,357,137 | B2 * | 1/2013 | Yandell | B65D 81/245 604/403 |
| 8,827,977 | B2 * | 9/2014 | Fangrow | A61J 1/2089 604/411 |
| 9,351,905 | B2 * | 5/2016 | Fangrow | A61J 1/2096 |
| 2008/0071243 | A1 * | 3/2008 | Yandell | A61J 1/1412 604/415 |
| 2010/0298806 | A1 * | 11/2010 | Yandell | A61J 1/1412 604/415 |
| 2012/0248057 | A1 * | 10/2012 | Bogle | A61J 1/1406 215/43 |

* cited by examiner

A-A cross-sectional view

B-B cross-sectional view

C-C cross-sectional view

MEDICAL RUBBER STOPPER AND METHOD FOR PRODUCING MEDICAL RUBBER STOPPER

TECHNICAL FIELD

The present invention relates to a medical rubber stopper and a method for producing a medical rubber stopper.

BACKGROUND ART

The quality stability of drugs in vials has been improved by laminating the leg portion of a rubber stopper, which is to be in contact with drugs, with an inert film, such as of fluororesin, to improve the chemical resistance of the rubber stopper. Known lamination methods include two-step molding processes (see FIGS. 1 and 2, and Patent Literature 1) and one-step molding processes (see FIG. 3).

Rubber stoppers produced by two-step molding processes are excellent in airtightness as the lower surface of their flange region and the base of their leg portion are provided as a rubber surface. The two-step molding processes, however, have a problem in that a molding step and a step of removing unnecessary parts both need to be performed twice, thereby resulting in poor productivity. Another problem is that oily preparations may reach the rubber surface to swell the rubber, thereby resulting in poor chemical resistance and airtightness.

On the other hand, one-step molding processes can produce rubber stoppers whose flange region has a lower surface entirely laminated with an inert film, and are also excellent in productivity as the number of steps is greatly smaller than that of the two-step molding processes. The airtightness of a vial can be achieved, for example, by bringing the inner wall and the upper surface of the vial into intimate pressure contact with the base of the leg portion and the lower surface of the flange region of a rubber stopper. However, disadvantageously, rubber stoppers produced by the one-step molding processes have poor airtightness because each of the above contact surfaces is hard glass or an inert film.

CITATION LIST

Patent Literature

Patent Literature 1: JP 2004-216753 A

SUMMARY OF INVENTION

Technical Problem

The present invention aims to provide a medical rubber stopper that is excellent in chemical resistance and airtightness while having good productivity.

Solution to Problem

The present invention relates to a medical rubber stopper, including: a disk-shaped head portion with a flange region; and a cylindrical leg portion protruding from a lower surface of the head portion and having a smaller diameter than the head portion, a lower surface of the flange region and the leg portion being laminated with an inert film, at least one of the lower surface of the flange region or an outer periphery of the leg portion being provided with an annular groove through which the base rubber is exposed.

Preferably, at least one edge of the groove is provided with a projection elevated above an adjacent surface of the inert film, and the projection has a height of 1 to 40 μm from the adjacent surface of the inert film.

The groove is preferably provided at least on the outer periphery of the leg portion.

The groove is preferably provided at least at a base of the leg portion.

The groove preferably has a width of 0.1 to 10 mm.

The inert film preferably has a thickness of 200 μm or less.

The present invention also relates to a method for producing a medical rubber stopper, the medical rubber stopper including: a disk-shaped head portion with a flange region; and a cylindrical leg portion protruding from a lower surface of the head portion and having a smaller diameter than the head portion, the method including: a molding step including forming by one step molding a rubber stopper in which a lower surface of the flange region and the leg portion are continuously laminated with an inert film; and a groove-forming step including forming an annular groove to expose the base rubber on at least one of the lower surface of the flange region or an outer periphery of the leg portion each laminated with the inert film.

The groove-forming step preferably includes forming the groove by laser processing.

Advantageous Effects of Invention

The present invention relates to a medical rubber stopper in which the lower surface of the flange region and the leg portion are laminated with an inert film, and the lower surface of the flange region and/or the outer periphery of the leg portion is provided with an annular groove through which the base rubber is exposed. The present invention also relates to a method for producing a medical rubber stopper, which includes: a molding step including forming by one step molding a rubber stopper in which the lower surface of the flange region and the leg portion are continuously laminated with an inert film; and a groove-forming step including forming an annular groove to expose the base rubber on the lower surface of the flange region and/or the outer periphery of the leg portion each laminated with the inert film. Accordingly, the present invention can provide a medical rubber stopper that is excellent in chemical resistance and airtightness while having good productivity.

BRIEF DESCRIPTION OF DRAWINGS

FIG. 4A a top view, FIG. 4B an A-A cross-sectional view, FIG. 4C a bottom view, FIG. 4D a side view thereof; and FIG. 4E a partially enlarged view of the groove provided at the base of the leg portion in the cross-sectional view.

FIG. 5A a top view, FIG. 5B a B-B cross-sectional view, FIG. 5C a bottom view, FIG. 5D a side view thereof; and FIG. 5E a partially enlarged view of the groove provided on the lower surface of the flange region in the cross-sectional view.

FIG. 7A a top view, FIG. 7B a C-C cross-sectional view, FIG. 7C a bottom view, and FIG. 7D a side view.

DESCRIPTION OF EMBODIMENTS

The present invention relates to a medical rubber stopper including: a disk-shaped head portion with a flange region; and a cylindrical leg portion protruding from the lower surface of the head portion and having a smaller diameter than the head portion. The lower surface of the flange region and the leg portion are laminated with an inert film, and the lower surface of the flange region and/or the outer periphery of the leg portion is provided with an annular groove through which the base rubber is exposed.

In the medical rubber stopper of the present invention, since the lower surface of the flange region and/or the outer periphery of the leg portion each laminated with an inert film is provided with an annular groove through which the base rubber is exposed, the groove portion where the base rubber is exposed can be brought into sufficiently intimate contact with the upper surface of the mouth and the inner wall of a vial upon capping of the vial, thereby resulting in good airtightness. This is presumably because upon capping of a vial with a rubber stopper designed to have a leg portion diameter larger than the mouth diameter of the vial, and upon sealing of the capped vial with an aluminum cap, the leg portion and the lower surface of the flange region are compressed to allow the base rubber defining the groove to be exposed to facilitate the contact with the upper surface of the mouth and the inner wall of the vial. In addition, the inert film ensures chemical resistance.

The medical rubber stopper of the present invention is therefore applicable to vials to be filled with drugs in any form, including powder, solid, liquid (solution, oil), and lyophilizate forms, and can provide them with excellent chemical resistance and airtightness.

Exemplary preferred embodiments of the present invention will be described below with reference to drawings.

FIG. 4 shows views of an exemplary medical rubber stopper of the present invention, including: (a) a top view, (b) a cross-sectional view, (c) a bottom view, and (d) a side view thereof; and (e) a partially enlarged view of the groove provided at the base of the leg portion (a part of the leg portion which is continuous with the lower surface of the flange region) in the cross-sectional view (circled portion).

Figure 4A:
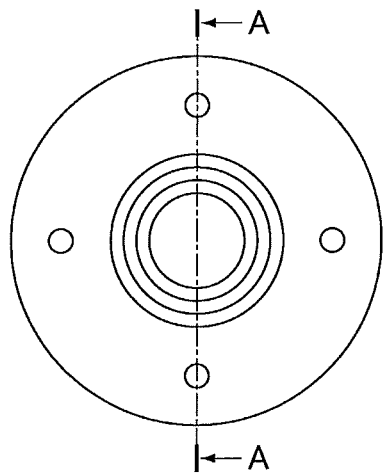
FIGS. 4A-4E are views of an exemplary medical rubber stopper of the present invention or medical rubber stoppers prepared in Examples 1 to 3, including.
Figure 4B:
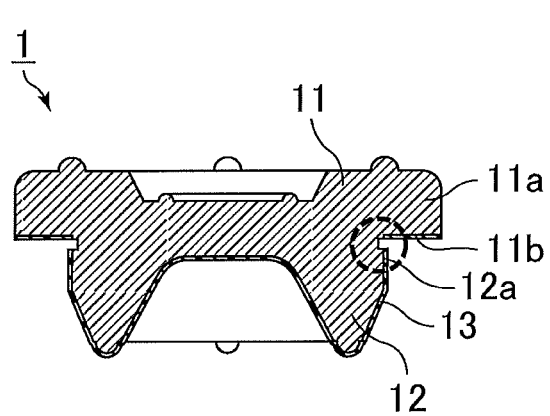
Figure 4C:
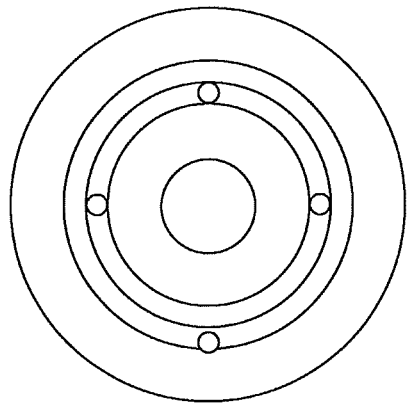
Figure 4D:
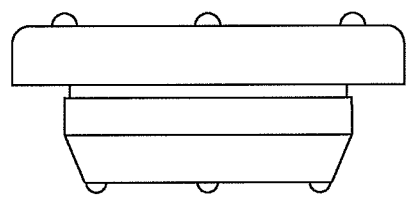
Figure 4E:
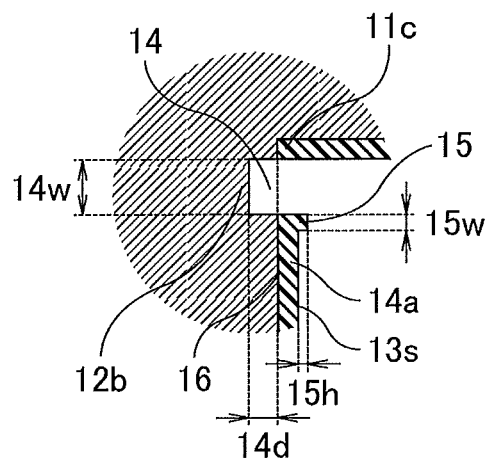

The exemplary medical rubber stopper 1 of the present invention shown in FIG. 4(b) includes a disk-shaped head portion 11 and a leg portion 12. The surfaces of the head portion 11 and the leg portion 12 are partially laminated with an inert film 13. The outer periphery 12a of the leg portion 12 is provided with a groove 14.

The head portion 11 includes a flange region 11a, and the leg portion 12 is provided to extend continuously from the inner edge 11c of the (donut-shaped) lower surface 11b of the flange region. The leg portion 12 is provided to protrude in the shape of a cylinder with a smaller diameter than the outer diameter of the head portion 11 from the lower surface of the head portion 11, specifically from the inner edge 11c of the lower surface of the flange region.

In the medical rubber stopper 1, since the lower surface 11b of the flange region and the surface of the leg portion 12 are laminated with an inert film 13, chemical resistance can be ensured for the medical rubber stopper. The thickness of the inert film 13 may be appropriately adjusted according to the shape or size of the medical rubber stopper, and is preferably 20 to 200 µm, more preferably 50 to 100 µm.

Figure 6A:
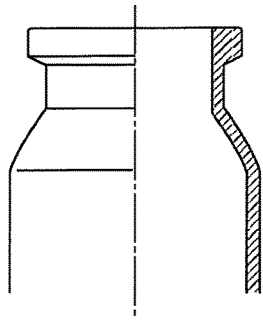
FIGS. 6A-6G are partial cross-sectional views of the mouths of vials.
Figure 6B:
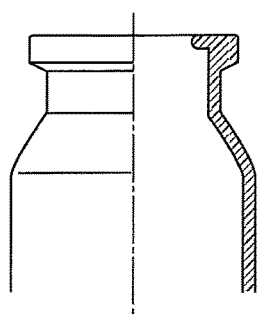
Figure 6C:
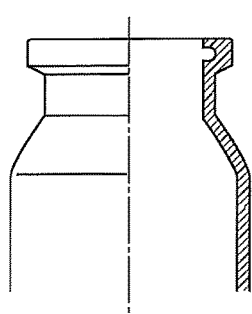
Figure 6D:
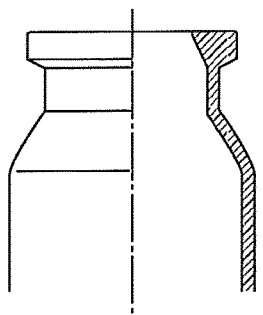
Figure 6E:
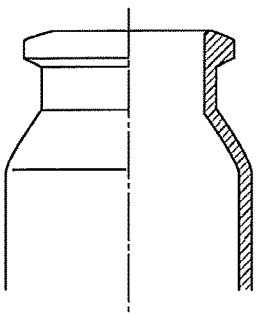
Figure 6F:
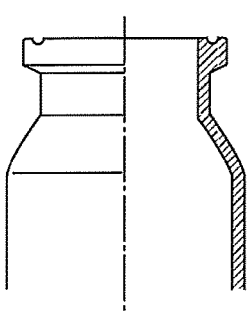

The medical rubber stopper 1 is provided with an annular groove 14 which is not laminated with the inert film 13 so that the base rubber is exposed. The groove 14 is provided on the outer periphery 12a of the base 12b of the leg portion 12 in a location which is continuous with the inner edge 11c of the lower surface of the flange region. The presence of the groove 14 provided at the base facilitates the contact with the inner wall of a bottle, leading to improved airtightness. Especially in the case of vials having a protrusion on the inner side of their mouth as illustrated in FIGS. 6(b) and 6(d), the groove fits the protrusion, thereby significantly enhancing the airtightness.

The "annular" shape of the groove 14 means a substantially annular shape centered on the central axis of the disk-shaped head portion. The cross-sectional shape of the groove is not particularly limited, and is preferably a simple recess or a rounded recess from the standpoint of productivity. Although FIG. 4(b) shows a case where the number of grooves 14 is one, a plurality of grooves 14 may be provided.

The width 14w of the groove 14 is preferably 0.1 to 10 mm, more preferably 0.5 to 8.0 mm, still more preferably 2.0 to 8.0 mm, from the standpoint of the balance between airtightness and chemical resistance. The depth 14d of the groove 14 from the adjacent interface 16 between the base rubber and the inert film 13 is preferably 0 to 100 µm, more preferably 0 to 50 µm, from the standpoint of airtightness.

As illustrated in the partially enlarged view (e) of the groove 14, the medical rubber stopper 1 is provided with a projection 15 at the edge 14a on the leg portion 12 side of the groove 14. The projection 15 is configured to be elevated above (protrude from) the adjacent surface 13s of the inert film 13. The presence of the projection 15 further enhances the airtightness.

The width 15w of the projection 15 is preferably 1 to 100 µm, more preferably 30 to 60 µm, from the standpoint of airtightness. The height 15h of the projection 15 from the adjacent surface 13s of the inert film 13 is preferably 1 to 40 µm, more preferably 10 to 25 µm, from the standpoint of airtightness. With the projection within the ranges indicated above, the airtightness can be further improved. The shape (cross-sectional shape) of the projection 15 is not particularly limited, and is preferably a simple projection or a rounded projection from the standpoint of productivity. The projection 15 may be provided at either one or both edges of the groove 14.

FIG. 5 shows views of another exemplary medical rubber stopper of the present invention, including: (a) a top view, (b) a cross-sectional view, (c) a bottom view, and (d) a side view thereof; and (e) a partially enlarged view of the groove provided on the lower surface of the flange region in the cross-sectional view (circled portion).

Figure 5A:
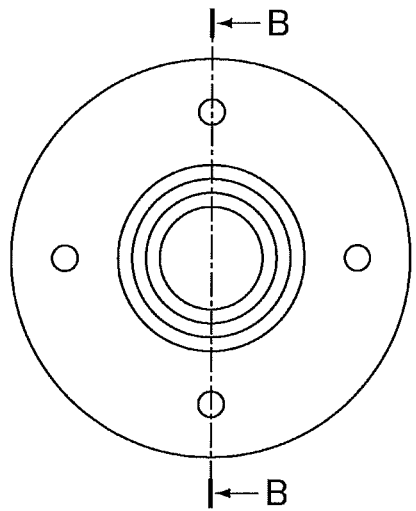
FIGS. 5A-5E are views of an exemplary medical rubber stopper of the present invention, including.
Figure 5B:
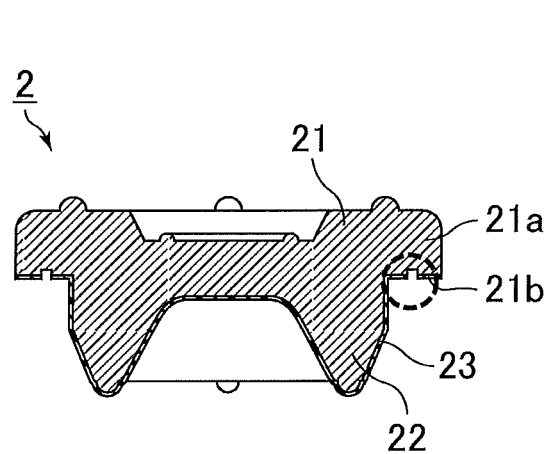
Figure 5C:
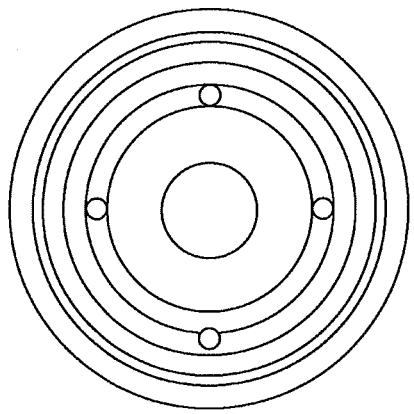
Figure 5D:
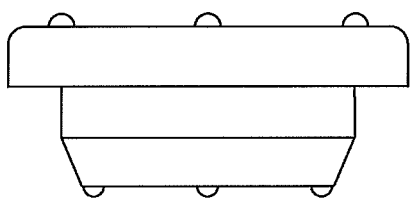
Figure 5E:
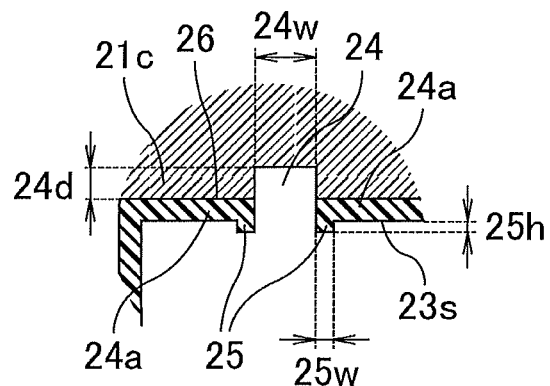

The exemplary medical rubber stopper 2 of the present invention shown in FIG. 5(b) includes a disk-shaped head portion 21 and a leg portion 22. The surfaces of the head portion 21 and the leg portion 22 are partially laminated with an inert film 23. The lower surface 21b of a flange region 21a is provided with a groove 24.

The head portion 21 and leg portion 22 are provided in the same manner as illustrated in FIG. 4 (flange region 21a, lower surface 21b and inner edge 21c of the flange region). The inert film 23 is also similarly laminated, and may have a similar thickness.

Figure 6G:
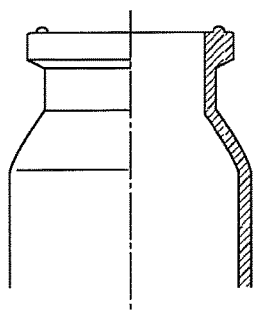
Figure 7A:
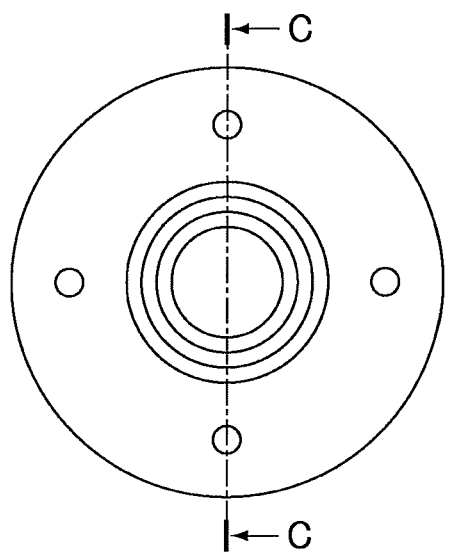
FIGS. 7A-7D are views of a medical rubber stopper prepared in Comparative Example 1, including.
Figure 7B:
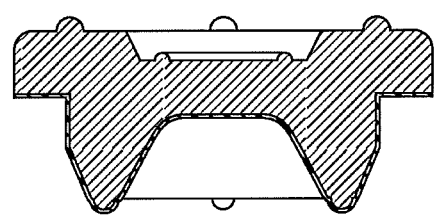
Figure 7C:
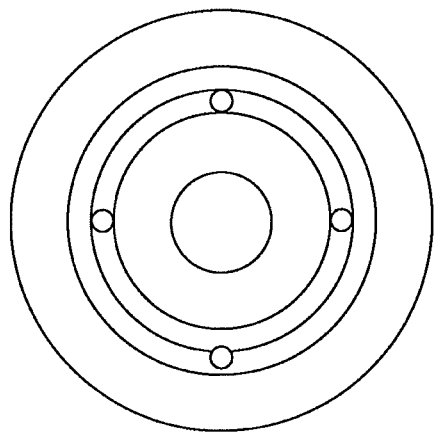
Figure 7D:
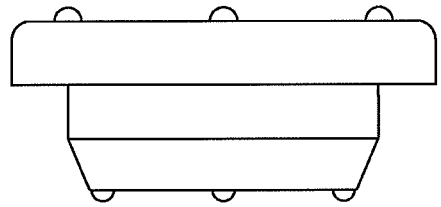

The medical rubber stopper 2 is provided with an annular groove 24 which is not laminated with the inert film 23 so that the base rubber is exposed. The groove 24 is provided in the substantial center of the lower surface 21b of the flange region. The presence of the groove 24 provided on the lower surface 21b of the flange region facilitates the contact with the mouth surface of a bottle, leading to improved airtightness. Especially in the case of vials having a protrusion on the upper surface of their mouth as illustrated in FIG. 6(g), the groove fits the protrusion, thereby significantly enhancing the airtightness.

The annular shape, number, and width 24w of the groove 24, and the depth 24d of the groove 24 from the adjacent interface 26 between the base rubber and the inert film 23 may be the same as those described above.

As illustrated in the partially enlarged view (e) of the groove 24, the medical rubber stopper 2 is provided with a projection 25 at the edge 24a on the center side of the groove 24. The projection 25 is configured to be elevated above (protrude from) the adjacent surface 23s of the inert film 23. The presence of the projection 25 further enhances the airtightness.

The width 25w and shape of the projection 25, and the height 25h of the projection 25 from the adjacent surface 23s of the inert film 23 may be the same as those described above. The projection 25 may be provided at either one or both edges of the groove 24.

The medical rubber stopper of the present invention including a disk-shaped head portion with a flange region, and a cylindrical leg portion protruding from the lower surface of the head portion and having a smaller diameter than the head portion can be produced by, for example, a method that includes: a molding step including forming by one step molding a rubber stopper in which the lower surface of the flange region and the leg portion are continuously laminated with an inert film; and a groove-forming step including forming an annular groove to expose the base rubber on the lower surface of the flange region and/or the outer periphery of the leg portion each laminated with the inert film. With this method, medical rubber stoppers having excellent chemical resistance and airtightness can be produced in good productivity.

Figure 1:
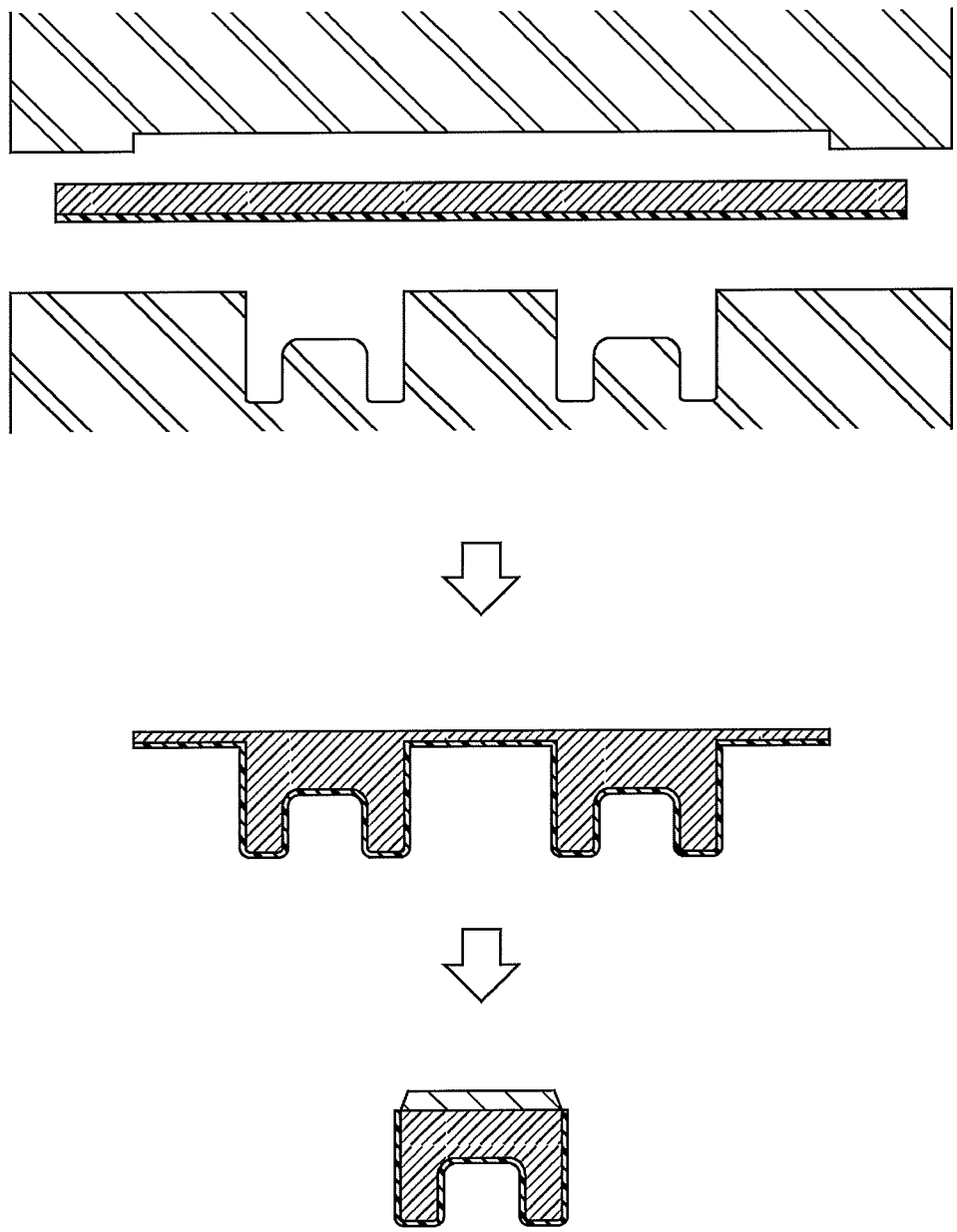
FIG. 1 is a view explaining a leg portion-forming step in a two-step molding process.
Figure 2:
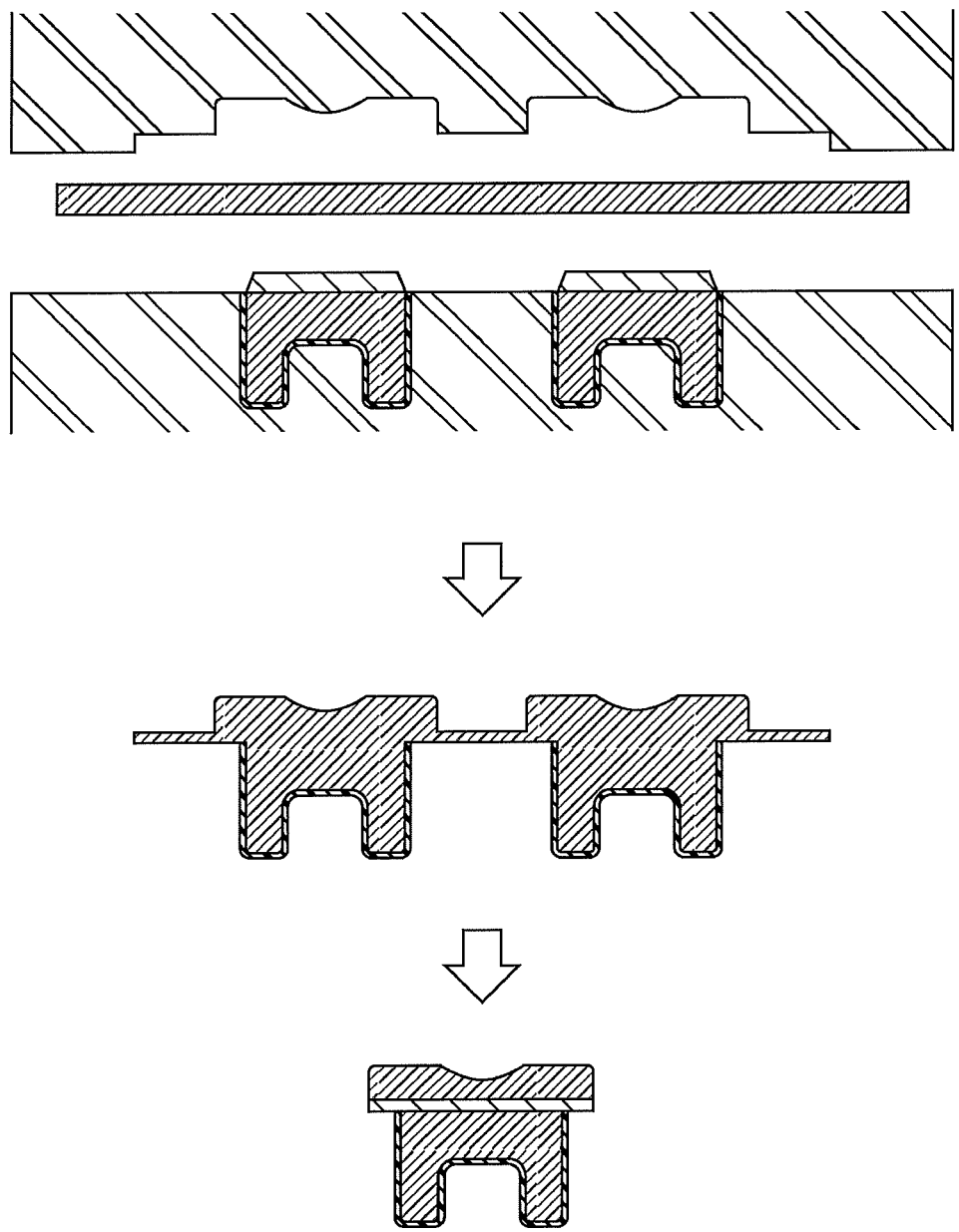
FIG. 2 is a view explaining a flange region-forming step in a two-step molding process.
Figure 3:
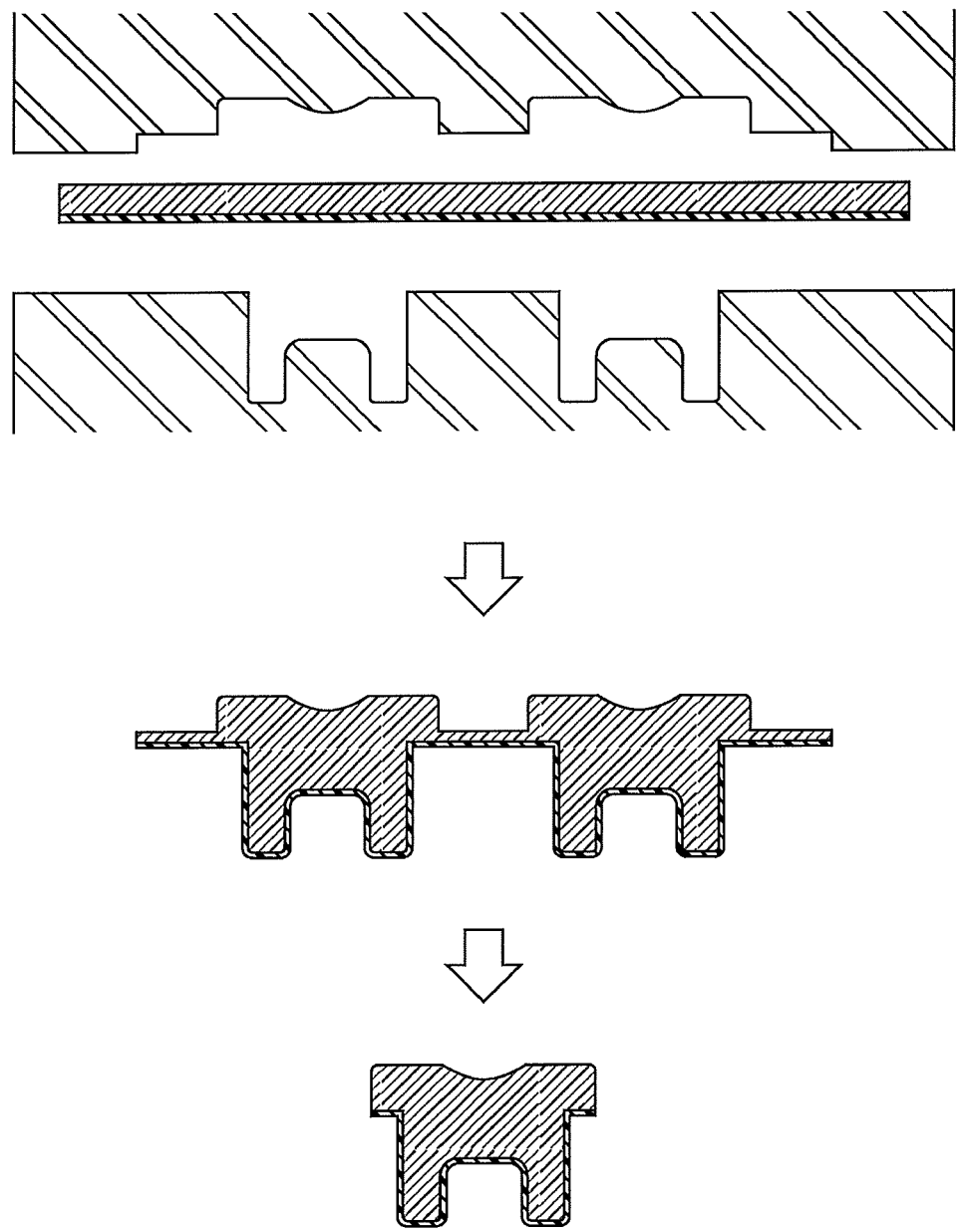
FIG. 3 is a view explaining a production method based on a one-step molding process.

FIG. 3 is a view schematically illustrating the molding step in this production method. A forming mold consists of an upper mold for forming a head portion with a flange region, and a lower mold for forming a leg portion. Each of these molds is connected to a heater (not shown) so that they can be heated. The heat source of the heater may be, for example, an electric heater, vapor, or oil. The material of the forming mold is not particularly limited, and known mold materials may be used. This one step molding process can produce a rubber stopper in which the lower surface of the flange region and the leg portion are continuously laminated with an inert film.

In the molding step, the upper and lower molds are preheated before the molding of a rubber stopper. The preheating temperature is preferably about 155 to 200° C.

An inert film superposed on a kneadate sheet (unvulcanized rubber sheet) formed from materials of a rubber stopper body is set on the upper surface of the lower mold. Here, the upper and lower molds may be disposed below and above, respectively, and an unvulcanized rubber sheet on which a lamination film is superposed may be placed on the upper mold.

The inert film is not particularly limited, and preferred examples include films of fluorinated resins such as tetrafluoroethylene polymers (PTFE), tetrafluoroethylene-ethylene copolymers (ETFE), modified tetrafluoroethylene polymers, modified tetrafluoroethylene-ethylene copolymers, and chlorofluoroethylene polymers (PCTFE), and films of olefinic resins. For good chemical resistance, the inert film is more preferably of a fluorinated resin, still more preferably ETFE or modified ETFE. The inert film is preferably subjected to a treatment for enhancing adhesion to rubber or the like (e.g. chemical treatment or surface roughening treatment).

The kneadate sheet for forming a rubber stopper body is formed of an elastic material. The elastic material of the rubber stopper body is not particularly limited, and examples include rubber materials such as natural rubber, butyl rubber, polyisoprene rubber, polybutadiene rubber, styrene-butadiene rubber, silicone rubber, epichlorohydrin rubber, ethylenepropylene rubber, and nitrile rubber; and thermoplastic elastomers such as polyurethane-based, polyester-based, polyamide-based, olefin-based, and styrene-based thermoplastic elastomers. Preferred among these are materials that become elastic by vulcanization. In the case of vulcanizable materials, compounding agents known in the rubber industry, such as vulcanizing agents (e.g. sulfur) and vulcanization accelerators, may be appropriately added.

The kneadate sheet can be prepared as follows. Compounding materials are mixed at a predetermined ratio using, for example, an internal mixer or open roll mill to give a kneadate, which is then prepared into an unvulcanized rubber sheet using a calendering machine or sheeting machine. Subsequently, an inert film is superposed on the unvulcanized rubber sheet of predetermined weight and size and placed on a mold, followed by vacuum-press molding to obtain a molded sheet including a set of laminated rubber stoppers.

The molding conditions are not particularly limited, and may be selected as appropriate. The molding temperature is preferably 155° C. to 200° C., more preferably 165° C. to 190° C. The molding time is preferably 3 to 15 minutes, more preferably 5 to 10 minutes.

If needed, unnecessary parts may be cut and removed from the molded rubber stopper, and the upper surface of the flange region or the surface laminated with the inert film of the rubber stopper may be coated with a non-reactive or reactive silicone.

Next, the rubber stopper prepared in the molding step is subjected to a groove-forming step that includes forming an annular groove to expose the base rubber on the lower surface of the flange region and/or the outer periphery of the leg portion each laminated with the inert film.

The groove may be formed by methods that can expose the base rubber of the laminate of the inert film and the rubber stopper body material, such as grinding. For the grinding, cutting tools, laser irradiation (laser processing) or other means may be used. Among these, grinding by laser irradiation is suitable because with this method, fine groove structures can be easily formed and also because then there is a smaller influence such as stress around the formation site.

The laser processing allows for suitable formation of an annular groove having a width and depth as described earlier on the outer periphery of the base of the leg portion or on the lower surface of the flange region. In addition, the surface of the inert film is evaporated or decomposed by laser light, and this material is then partially re-accumulated at the edge of the groove to form a projection. Thus, a projection having a width and height as described earlier and elevated above the adjacent surface of the inert film can be suitably formed at at least one edge of the groove. The direction of laser irradiation may be varied to form a projection only at one edge of the groove.

The type, output, and other conditions of laser light may be selected as appropriate. For example, laser processing using infrared light is industrially easy to carry out. The irradiation time may also be selected as appropriate. In order to reduce the influence of heat on the surroundings of the cutting site, short-pulse irradiation is particularly preferred.

The medical rubber stopper of the present invention that may be produced as described above or by other methods is used to seal vials filled with drugs. For example, a vial filled with a drug is capped with the medical rubber stopper and then sealed with an aluminum or resin cap before use.

EXAMPLES

The present invention is specifically described with reference to, but not limited to, examples.

Examples 1 to 3

An inert film with one adhesive-treated surface superposed on an unvulcanized rubber sheet, which are described below, was placed on a forming mold and vulcanization-bonded using a vacuum press at 175° C. for 10 minutes for one step molding to prepare a rubber stopper having the shape described below. Both surfaces were silicone-coated, and burrs were removed. Then, an annular groove having the width and depth listed in Table 1 and a projection having the width and height listed in Table 1 (at the edge of the groove) were formed at the base of the leg portion using a laser device as described below. Then, cleaning, sterilization, and drying were performed to obtain a desired rubber stopper as illustrated in FIG. 4.

Comparative Example 1

A desired rubber stopper as illustrated in FIG. 7 was prepared in the same manner as in Examples 1 to 3, except that no groove and no projection located at its edge were formed.

Reference Example 1

A desired rubber stopper was prepared in the same manner as in Examples 1 to 3, except that no inert film was used and no groove and no projection located at its edge were formed.

Reference Example 2

A desired rubber stopper was prepared by conventional two step molding.
(Method for Testing Airtightness)

Among glass vials in various shapes such as those illustrated in FIGS. 6(a) to 6(g), a closure stopper vial (b) (inner diameter of mouth: 12.45 mm, full capacity: 14.2 ml, length (in inner diameter direction) and width (in axial direction) of protrusion: 1 to 2 mm) in which the upper surface of the mouth was flat and the inner diameter of the top side of the mouth was reduced to prevent uplifting or dropping of the rubber stopper after capping was used.

A silica gel desiccant tablet (Yamani chemicals, 0.62 g per tablet) was accurately weighed and placed in a dry and clean 10 ml vial. An aluminum cap was seamed to the vial under normal pressure. The vial was stored in a thermostat at a temperature of 40° C. and a humidity of 75% for a month or three months. Then, the silica gel desiccant was taken out and accurately weighed to determine the weight increase (change in the weight of moisture absorbed by the silica gel desiccant). Table 1 shows the results.

TABLE 1

| | Rubber stopper | | | | | | Airtightness test | |
| --- | --- | --- | --- | --- | --- | --- | --- | --- |
| | Inert film | Groove formation by laser | Width of groove (mm) | Depth of groove (μm) | Height of projection (μm) | Width of projection (μm) | One month later (mg) | Three months later (mg) |
| Example 1 | Modified ETFE | Formed | 1 | 42 | 19 | 49 | 0.8 | 1.5 |
| Example 2 | Modified ETFE | Formed | 3 | 51 | 22 | 53 | 0.7 | 1.6 |
| Example 3 | Modified ETFE | Formed | 7 | 47 | 24 | 43 | 0.5 | 1.2 |
| Comparative Example 1 | Modified ETFE | Not formed | — | — | — | — | 28.5 | 65.8 |
| Reference Example 1 | Not used | Not formed | — | — | — | — | 0.5 | 1.1 |
| Reference Example 2 | Modified ETFE | Not formed | — | — | — | — | 0.7 | 1.4 |

(Materials and Devices)

Unvulcanized rubber sheet: 100 parts by mass of chlorinated butyl rubber added to 50 parts by mass of a silica-based filler (JIS-A hardness: 45).

Inert film: modified ETFE "AFLEX" (thickness: 75 μm, surface roughness Ra (μm): 0.02 to 0.03 (cut-off value: 0.08, evaluation length: 0.25)) available from Asahi Glass Co., LTD.

Laser device: ML-Z9550T available from Keyence Corporation
(Basic Shape of Rubber Stopper)

Flange region diameter: 19.0 mm (outer diameter), maximum diameter of leg portion: 13.0 mm, flange region thickness: 3.0 mm, thickness of needle penetration site: 2.0 mm Table 1 shows that the rubber stoppers of the examples as illustrated in FIG. 4 had similarly excellent airtightness as in the reference examples in which the lower surface of the flange region was not laminated with an inert film, while the rubber stopper of the comparative example as illustrated in FIG. 7 had inferior airtightness.

Moreover, the rubber stoppers of the examples exhibited excellent chemical resistance in a test using a liquid drug, and therefore achieved a good balance of excellent airtightness and chemical resistance. Additionally, these rubber stoppers can be produced by one-step molding processes in good productivity.

REFERENCE SIGNS LIST

1: medical rubber stopper
11: head portion
11a: flange region
11b: lower surface of flange region
11c: inner edge of lower surface of flange region
12: leg portion
12a: outer periphery of leg portion
12b: base of leg portion
13: inert film
13s: surface of inert film
14: groove
14a: edge of groove
14w: width of groove
14d: depth of groove
15: projection
15w: width of projection
15h: height of projection
16: interface between base rubber and inert film
2: medical rubber stopper
21: head portion
21a: flange region
21b: lower surface of flange region
21c: inner edge of lower surface of flange region
22: leg portion
23: inert film
23s: surface of inert film
24: groove
24a: edge of groove
24w: width of groove
24d: depth of groove
25: projection
25w: width of projection
25h: height of projection
26: interface between base rubber and inert film

The invention claimed is:

1. A medical rubber stopper, comprising:
a disk-shaped head portion with a flange region; and
a cylindrical leg portion protruding from a lower surface of the head portion and having a smaller diameter than the head portion,
a lower surface of the flange region and the leg portion being laminated with an inert film,
at least one of the lower surface of the flange region or an outer periphery of the leg portion being provided with an annular groove through which a base rubber is exposed,
wherein the groove has a width of 0.1 to 10 mm.

2. The medical rubber stopper according to claim 1, wherein at least one edge of the groove is provided with a projection elevated above an adjacent surface of the inert film, and the projection has a height of 1 to 40 μm from the adjacent surface of the inert film.

3. The medical rubber stopper according to claim 1, wherein the groove is provided at least on the outer periphery of the leg portion.

4. The medical rubber stopper according to claim 1, wherein the groove is provided at least at a base of the leg portion.

5. The medical rubber stopper according to claim 1, wherein the inert film has a thickness of 200 μm or less.

6. A medical rubber stopper, comprising:
a disk-shaped head portion with a flange region; and
a cylindrical leg portion protruding from a lower surface of the head portion and having a smaller diameter than the head portion,
a lower surface of the flange region and the leg portion being laminated with an inert film,
at least one of the lower surface of the flange region or an outer periphery of the leg portion being provided with an annular groove through which a base rubber is exposed,
wherein at least one edge of the groove is provided with a projection elevated above an adjacent surface of the inert film, and the projection has a height of 1 to 40 μm from the adjacent surface of the inert film.

* * * * *